Reissued Mar. 23, 1937

Re. 20,306

UNITED STATES PATENT OFFICE 20,306

METHOD FOR GOLD PLATING

Hiram S. Lukens, Philadelphia, Pa., assignor to C. Howard Hunt Pen Company, Camden, N. J., a corporation of New Jersey No Drawing. Original No. 2,039,328, dated May 5, 1936, Serial No. 21,190, May 13, 1935, which is a continuation of Serial No. 707,502, January 20, 1934. Application for reissue August 5, 1936, Serial No. 94,469

8 Claims. (Cl. 204—12)

This invention relates to a method for gold plating and is especially concerned with the plating of a chromium alloy steel. The application, furthermore, is a continuation of my copending application Serial No. 707,502, filed January 20th, 1934.

The principal object of the invention is to provide a gold plating method which will produce a plate tenaciously adhering to the base metal. In this connection, it should be understood that heretofore it has been very difficult, if not impossible, to produce a satisfactory gold plating on a chrome alloy steel, such as the so-called corrosion resistant steel alloys which are usually chiefly comprised of chromium, nickel and iron with the addition of smaller amounts of other elements which are added for the purpose of still further increasing the corrosion resistance or other properties of the product. As a specific example of the composition, it might be noted that alloys for certain purposes, for example for the production of pen points, may contain in the neighborhood of 18% chromium, about 8% nickel, 2½% molybdenum, and the balance iron and incidental impurities.

Before discussing the method steps themselves, it might be noted that chromium steel alloys are ordinarily considered to be rendered corrosion resistant or stainless by virtue of the formation, on the surface of the alloy, of a non-metallic oxide film. This non-metallic film forms on the surface of the alloy very quickly upon exposure to the atmosphere, and, apparently, it is this film which has heretofore made it very difficult, if not impossible, to secure an adherent gold plate.

In accordance with the method steps disclosed in my copending application above referred to, I apparently secure direct bonding of the plate to the base metal, without the interposition of an oxide film. Thus, even though the oxide film has been eliminated and replaced, so to speak, by the gold plate, the resulting article is one which is not subject to tarnishing or corrosion. It will be seen, therefore, that even though the very thing which is usually considered to provide the protection for a metal of the type in question has been removed, the articles are not subject to the difficulties heretofore encountered. In this way, I am enabled to produce an article (such, for instance, as a pen point) having the appearance and some of the characteristics of gold, and this article under conditions of normal use will not corrode or tarnish and is, of course, much less expensive than a solid gold article.

In carrying out the method as described in my copending application above referred to, the articles are first formed from the chromium alloy steel and, after thorough cleaning, as by an alkaline wash, I proceed as follows:

I subject the articles to the action of a bath capable of removing the oxide film such as a hydrochloric acid bath in sufficient concentration to accomplish the result. The action of the bath may be accelerated by electrolysis and may contain from about 25% to about 50% hydrochloric acid.

Subsequent to this treatment, which apparently destroys the oxide film, I preferably rinse the articles in a dilute acid wash. By way of example, this wash may contain from about 10% to about 15% hydrochloric acid. Subsequent to the washing, the articles are transferred very quickly to an electroplating bath, and it is to be noted that the rapidity of transfer is useful when following these steps for the reason that the relatively low strength of the hydrochloric acid wash is only sufficient to prevent the reformation of the oxide film for a relatively short period of time. Further with reference to the foregoing point, the hydrochloric acid rinse or wash is relatively low in concentration in order to avoid carrying large quantities of hydrochloric acid into the plating bath and thus building up the acid content of the plating bath beyond the preferable figure.

With reference to the above, it should be noted that the washing of the articles in dilute hydrochloric acid is not essential. In fact, I may even eliminate this wash entirely or substitute a water wash, especially where it is convenient to transfer the articles very rapidly from the strong hydrochloric bath to the water wash and from there to the plating bath. In accordance with my understanding of the action which takes place, the important factor when treating the articles in this way to remove the oxide film is to carry on the several steps in such manner as to provide for the electrodeposition of some metal before the oxide film has had time or opportunity to reform to any appreciable extent.

As to the plating itself, I first employ a plating bath of the acid type produced, for example, in accordance with the disclosure of my copending application above referred to. That is, the bath may be composed of the following ingredients in the approximate proportions indicated:

| | | |
|---|---|---|
| Concentrated hydrochloric acid | pt. | 1 |
| Sodium cyanide | oz. | 8 |
| Sodium gold cyanide | oz. | ⅛ |
| Water | gal. | 1 |

A bath made up in this way is slightly acid or, in other words, has a relatively low hydrogen ion concentration, and I find that this is preferable, although, if desired, the acidity may be reduced until the bath approaches neutrality, or increased until the bath becomes almost a concentrated hydrochloric acid bath containing a little gold and cyanide.

The fact that the plating bath has at least a slight acid reaction is important in preventing reformation of the oxide film before some metal has been deposited. In addition, I have found that the success of this gold plating operation is apparently due to the presence in the plating bath of free hydrocyanic acid. This acid, of course, is produced by the hydrochloric acid and the cyanide in the bath and the apparent effect of the hydrocyanic acid is to inhibit the reformation of the oxide or other film and to improve the throwing power of the plating solution. I have shown by tests that the quantity of free hydrocyanic acid present is not critical. Preferably, the bath should contain sufficient to give a slight acid reaction to litmus, and the quantity may be carried up at least to an amount equivalent to that which will combine with the gold present. Having initially prepared a bath with the proportions of ingredients listed above, I prefer to renew the supply of hydrocyanic acid either by adding an additional supply of sodium cyanide at periodic intervals or in some other equivalent manner. As a guide in determining when additional sodium cyanide is necessary, the brilliance of the deposit may be observed. When the deposit noticeably loses its brilliance, additional cyanide should be added. Ordinarily, in an average plating bath of fifteen gallons capacity, it is sufficient to add a few ounces of sodium cyanide for each 500 gross of pens plated.

It will be understood that the gold plating solution may also be prepared from other gold salts. For example, gold chloride may be employed, although in this instance also it is necessary to use hydrochloric acid and cyanide so as to ensure the presence of free hydrocyanic acid.

After this initial gold plating step, the articles may be removed from the bath and the film of oxide, of course, will not reform. The articles may be used in this condition, although I prefer to add a second gold plate in one of the common types of alkaline baths, such as a cyanide bath.

By way of example, a suitable alkaline bath may contain about ½ ounce sodium gold cyanide and about 2½ ounces sodium cyanide per gallon of water.

In summarizing the foregoing steps, it will be seen that the articles are first treated with acid to remove the non-metallic or oxide film, and thereafter the plating is accomplished by electrodeposition in a novel type of electroplating bath and in a manner which prevents reformation of any film until a direct bonding of the plate to the metal is secured. Where a direct bonding is obtained, of course, the oxide film cannot reform.

While all of the reasons why the foregoing procedure is effective for the purposes here involved, including the prevention of tarnishing or corrosion, may not be fully understood, I have found in actual practice that a highly adherent gold plate is deposited in the presence of free hydrocyanic acid. Even though the non-metallic corrosion proof film has been removed and replaced by a gold plate, the final product is one which is not subject to tarnishing or corrosion. It might seem that since the protective film is removed and replaced by a plate which is well known to be porous, the final product would be subject to difficulties similar to those encountered with prior gold plated articles where the base metal was not of a type which produces an oxide film. I have found, however, that articles plated in accordance with my improved process are not subject to corrosion and the reason for this may be that the oxide film reforms in the pores of the plating. I have also noticed that where wear occurs in an article plated in accordance with this invention so as to expose the alloy, the oxide film immediately reforms on the exposed surface.

In any event, my improved article, as a matter of fact, is not subject to noticeable corrosion under normal conditions of service.

The numerous objects of the invention will be apparent to those skilled in the art, although it might be mentioned that durability of the plating and resistance to tarnishing and corrosion are the most outstanding advantages.

I claim:

1. The method of gold plating a so-called stainless steel article which includes the steps of dissolving the oxide film normally present on the article, and electrodepositing gold from an acid gold plating solution containing free hydrocyanic acid.

2. The method of gold plating a so-called stainless steel article on the surface of which a nonmetallic oxide film normally forms which includes the steps of subjecting the article to a concentrated hydrochloric acid solution, washing the article in a dilute hydrochloric acid solution, and electrolytically depositing a gold plate on the article from a plating bath containing approximately the following proportions of ingredients: to each gallon of water, 1 pint of concentrated hydrochloric acid, 8 ounces sodium cyanide, and ⅛ ounce sodium gold cyanide.

3. The method of gold plating a so-called stainless steel article on the surface of which a nonmetallic oxide film normally forms which includes the steps of subjecting the article to a concentrated hydrochloric acid solution, washing the article in a dilute hydrochloric acid solution, and electrolytically depositing a gold plate on the article from a plating bath containing water, hydrochloric acid, sodium cyanide, and sodium gold cyanide.

4. The method of gold plating a so-called stainless steel article on the surface of which a nonmetallic oxide film normally forms, which method includes the steps of subjecting the article to hydrochloric acid, and electrolytically depositing a gold plate on the article from a plating bath containing a gold salt, hydrochloric acid and sodium cyanide.

5. The method of gold plating a so-called stainless steel article on the surface of which a nonmetallic oxide film normally forms, which method includes the steps of subjecting the article to hydrochloric acid, and electrolytically depositing a gold plate on the article from a plating bath containing hydrochloric acid, sodium cyanide, and sodium gold cyanide.

6. The method of gold plating a so-called stainless steel article on the surface of which a nonmetallic film normally forms, which method includes the steps of subjecting the article to an acid solution capable of dissolving said film, rinsing the article to remove the excess acid, and electrolytically depositing gold thereon from a plating solution containing free hydrocyanic acid.

7. The method of gold plating a so-called stainless steel article on the surface of which a non-metallic film normally forms, which method includes the steps of subjecting the article to a bath capable of dissolving said film, rinsing the article, and electrolytically depositing gold thereon from a gold plating solution containing free hydrocyanic acid.

8. The method of gold plating a so-called stainless steel article which includes the steps of dissolving the oxide film normally present on the article and electro-depositing gold from an acid gold plating solution containing hydrochloric acid and sodium cyanide.

HIRAM S. LUKENS.